United States Patent
Tas et al.

(10) Patent No.: US 8,770,382 B2
(45) Date of Patent: Jul. 8, 2014

(54) DEVICE FOR FEEDING BOOK BLOCKS INTO THE INFEED CHANNEL OF A SUBSEQUENT PROCESSING ARRANGEMENT

(71) Applicant: Kolbus GmbH & Co. KG, Rahden (DE)

(72) Inventors: Yahya Tas, Stemwede (DE); Nicolas Regent, Steinbach am Donnersberg (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

(21) Appl. No.: 13/771,914

(22) Filed: Feb. 20, 2013

(65) Prior Publication Data

US 2013/0213765 A1    Aug. 22, 2013

(30) Foreign Application Priority Data

Feb. 21, 2012 (DE) .......................... 10 2012 003 602

(51) Int. Cl.
  *B65G 47/244* (2006.01)
  *B42C 19/08* (2006.01)

(52) U.S. Cl.
  CPC .............. *B65G 47/244* (2013.01); *B42C 19/08* (2013.01)
  USPC ................. 198/408; 198/377.03; 198/377.07; 198/406; 198/413; 198/459.2; 198/478.1

(58) Field of Classification Search
  CPC ....... B65G 47/244; B42C 19/08; B65H 29/40
  USPC ............ 198/377.03, 377.07, 377.1, 379, 406, 198/407, 408, 412, 413, 459.2, 478.1
  See application file for complete search history.

(56) References Cited

U.S. PATENT DOCUMENTS

| 1,449,027 | A | * | 3/1923 | Allen | 198/406 |
| 5,979,634 | A | * | 11/1999 | Odegard et al. | 198/408 |
| 6,032,784 | A | * | 3/2000 | Bellanca et al. | 198/406 |
| 7,036,655 | B2 | * | 5/2006 | Schafer | 198/459.2 |
| 7,357,244 | B2 | * | 4/2008 | Grewe | 198/460.1 |
| 8,151,971 | B2 | * | 4/2012 | Baldanza et al. | 198/418.5 |

FOREIGN PATENT DOCUMENTS

| DE | 71 25 313 U | 10/1971 |
| DE | 10 2004 019 756 A1 | 11/2005 |

* cited by examiner

*Primary Examiner* — Mark A Deuble
(74) *Attorney, Agent, or Firm* — Alix, Yale & Ristas, LLP

(57) ABSTRACT

In a device for feeding book blocks (2) into the infeed channel (11) of a subsequent processing arrangement with an intermittently rotating star feeder (31) that features several block receptacles (34) that are arranged on a roller divided into disks (33) in a star-shaped fashion and respectively feature perpendicularly aligned first and second locating surfaces (34.1, 34.2), it is proposed that the star feeder (31) features several clamping jaws (36) that are respectively assigned to the block receptacles (34) and arranged parallel to the second locating surfaces (34.2), as well as movable relative to the latter. The star feeder (31) can be operated with a significantly higher angular acceleration and rotational speed without risking that the book blocks lose contact in the block receptacles (34). Even loosely gathered book blocks (2) can be flawlessly processed.

19 Claims, 2 Drawing Sheets

DEVICE FOR FEEDING BOOK BLOCKS INTO THE INFEED CHANNEL OF A SUBSEQUENT PROCESSING ARRANGEMENT

BACKGROUND

The present invention pertains to a device for feeding book blocks into the infeed channel of a subsequent processing arrangement.

A feed device of this type is known from DE 71 25 313 U. Book blocks are supplied while lying flat and positioned upright by a revolving conveyor element, namely in such a way that they stand on their fore edge cut in order to be subsequently transported onward by feeders in the infeed channel of a book production line. The intermittently rotating conveyor element is also referred to as a star feeder and consists of a roller that is divided into disks and features several block receptacles in the form of cutouts that are arranged in a star-shaped fashion and respectively feature perpendicularly aligned first and second locating surfaces. The book blocks are fed to the star feeder essentially tangential referred to the roller and transverse to the rotational axis while lying flat and transported away parallel to the rotational axis after they were positioned upright. DE 71 25 313 U describes a star feeder that is divided into six segments and in which the book blocks are conveyed into the respective cutout by means of a belt conveyor that is inclined by 30° while contacting the first locating surface. As the star feeder begins to rotate, the book blocks are lifted off the belt conveyor by the second locating surface and then positioned upright. Star feeders that are divided into eight segments and position the book blocks upright from a horizontal position within an intermediate stop at a 45° incline were developed for higher cycle capacities.

When processing book blocks consisting of several loosely gathered signatures and/or sheets, in particular, it may occur that the book blocks slide apart due to the centrifugal forces and acceleration forces that act during the rotative uprighting such that the order and alignment of the book blocks is lost. The cycle capacity is also limited due to the fact that the book blocks may lift off the locating surfaces and overturn at an excessively high braking deceleration for the intermediate stop at the 45° incline.

SUMMARY

It is the objective of the present invention to enhance a feed device of the initially described type in such a way that a gentle handling, in particular, of loosely gathered book blocks is ensured at high processing speeds.

According to an aspect of the invention, the star feeder features several clamping jaws that are respectively assigned to the block receptacles and arranged parallel to the second locating surfaces, as well as movable relative to the latter. The book blocks are respectively pressed against the second locating surface of the block receptacles by the clamping jaws and thusly fixed during the uprighting in the block receptacles. The star feeder can be operated with a significantly higher angular acceleration and rotational speed without risking that the book blocks lose contact with the first and second locating surfaces or even overturn. The invention makes it possible, in particular, to process loosely gathered book blocks that now can also be positioned upright with high processing speeds such that the individual signatures and/or sheets are not shifted relative to one another.

The star feeder is preferably in the form of a roller intermittently rotatable about a main axis and comprising a plurality of block receptacles arranged in a star pattern, wherein each receptacle is formed by first and second locating surfaces on each of a plurality of axially spaced disks. The first locating surfaces extend radially and the second locating surfaces extend perpendicular to the first locating surfaces. The upstream book block feeder feeds flat book blocks to the star feeder substantially tangentially to the roller and transversely to the main axis. The star feeder includes a plurality of clamping jaws that are respectively operatively associated with the plurality of block receptacles, each clamping jaw arranged substantially parallel to the second locating surfaces and movable transversely relative to the second locating surfaces in opening and clamping directions. Each receptacle receives a flat book block from the book block feeder while the respective clamping jaw is relatively open, during rotation of the star feeder reorients the flat book block into upright orientation while clamped between a respective jaw and associated second locating surfaces, thereby positioning the upright book block for transport in a direction parallel to the rotation axis, toward the infeed channel.

Book blocks with different block thickness can be processed if the clamping jaws press against the second locating surfaces in a spring-loaded fashion. A block thickness adjustment is not required in this case.

The clamping jaws are preferably closed and opened by means of a control cam. The opening and closing motion is simply generated in that the cam rollers arranged on the clamping jaws or their guide element roll on the control cam during the rotation of the star feeder. Driving means for each individual clamping jaw are not required. In order to at least close the clamping jaws while the star feeder is at a standstill, the control cam can be turned back and forth about the rotational axis of the star feeder in a cyclic fashion by driving means such as, e.g., a pneumatic cylinder such that the respective clamping jaw to be closed in the infeed region of the star feeder is activated by the corresponding cam segment of the control cam before the star feeder starts to rotate again. If the clamping jaws are already opened during the rotational motion of the star feeder just before the book blocks reach their final upright position, the book blocks can be immediately pushed off the star feeder. The push-off motion may be superimposed on the end of the rotational motion of the star feeder such an additional increase of the cycle capacity is achieved.

The respective block thickness of the book blocks positioned upright by the star feeder can be easily determined with an integrated block thickness measuring device by determining the actual position of the respective clamping jaws that are actuated into the closed position in a certain rotational position of the star feeder. This also makes it possible to detect if a block receptacle is unoccupied. The measured block thickness can be used for adjustments of the subsequent processing arrangement that are dependent on the block thickness and/or a thickness control is carried out as part of a completeness check that makes it possible to purposefully sort out rejects prior to subsequent processing.

In another embodiment, it is proposed to assign at least one push-out unit that is driven separately by at least one pusher of the infeed channel to the star feeder. If so required, the star feeder with the at least one separately driven push-out unit can be decoupled from the infeed channel of the subsequent processing arrangement, wherein a book block that was already positioned upright in the infeed channel is not transferred immediately, but rather purposefully to a respective pusher of the infeed channel. In addition, a push-off motion can be defined that allows a gentle start of the push-out unit relative to the book block to be pushed off on the one hand and a synchronous transfer to the continuously moving pusher of the infeed channel on the other hand. In this respect, the push-off motion may be variable in accordance with the format height of the book block. The at least one push-out unit is preferably designed for selectively pushing the book blocks off the star feeder in opposite conveying directions such that, for example, book blocks determined to be faulty can be sorted out and routed into a transverse stack delivery arranged opposite of the infeed channel.

The book block feeder with the separately driven push-out unit may be arranged along the infeed channel of the subsequent processing arrangement if the at least one push-out unit is designed for transferring and conveying the book blocks supplied in the conveying direction of the infeed channel into the infeed channel. A partition wall arranged in the infeed channel in the region of the star feeder makes it possible to join partial book blocks that are supplied in the conveying direction of the infeed channel and supplied by means of the star feeder and to subsequently feed the joined partial book blocks to the subsequent processing arrangement in the form of a complete book block. According to an enhancement, it is proposed that at least two star feeders are arranged on the infeed channel.

BRIEF DESCRIPTION OF THE DRAWING

Exemplary embodiments of the inventive device are described below with reference to the drawing, in which the following schematic representations are presented.

DETAILED DESCRIPTION

Figure 1:
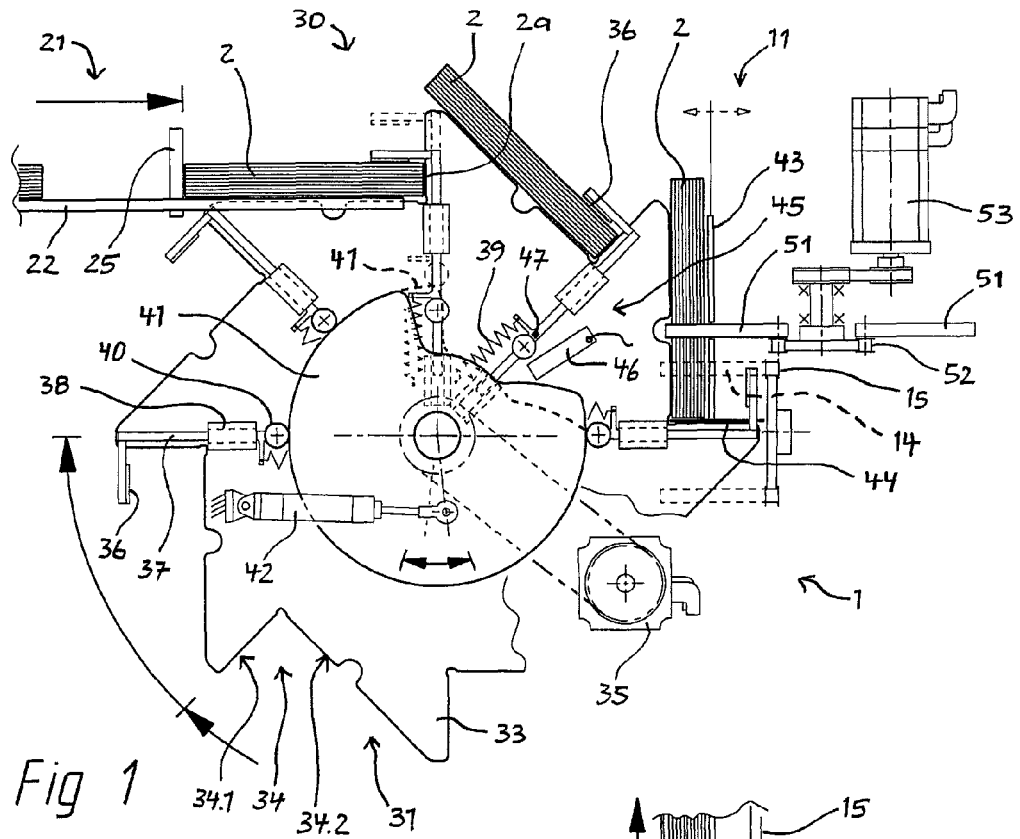
FIG. 1 shows a side view of a book block feeder in the form of a star feeder.
Figure 2:
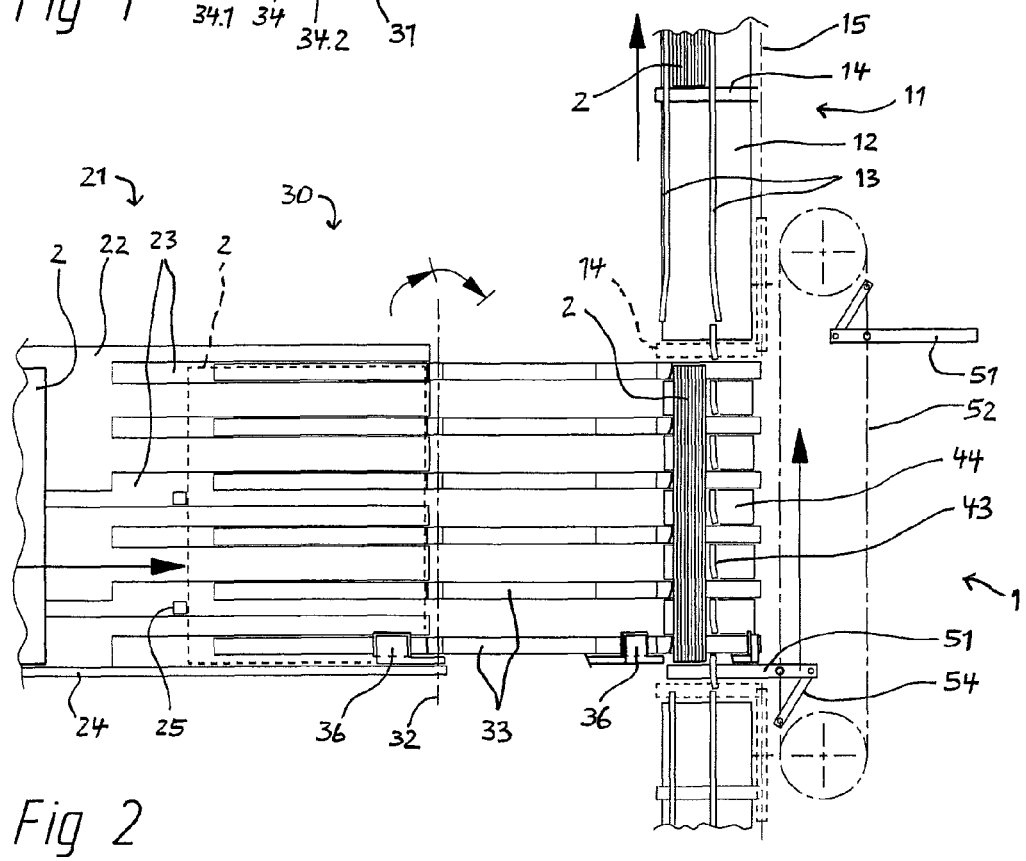
FIG. 2 shows a top view of the star feeder.

The feed device 1 illustrated in FIGS. 1 and 2 serves for feeding book blocks 2 to subsequent processing equipment or processes such as a perfect binder, wherein only a section of an infeed channel 11 for the perfect binder is illustrated in the figures. The book blocks 2 are conveyed to the transport clamps of the perfect binder in the equipment or process infeed channel 11 formed by the channel bottom 12 and lateral channel guides 13, by means of pushers 14 that are arranged on a continuously revolving conveyor chain 15 and equidistantly spaced apart from one another. With respect to its drive, the conveyor chain 15 is coupled to the perfect binder. The feed device 1 may also be arranged in a book production line or another subsequent processing arrangement for book blocks.

The feed device 1 features a book block feeder 30 in the form of a star feeder 31. Book blocks 2 supplied by a feed conveyor 21 while lying flat are received by the star feeder 31 and positioned upright on their spine 2a by means of a two-stage rotational motion, as well as ultimately pushed off into the infeed channel 11. The feed conveyor 21 illustrated in the exemplary embodiment features intermittently advancing pushers 25 that push the book blocks 2 to the star feeder 31 on a slide sheet 22 while they are in contact with a lateral guide 24. The book blocks 2 may be manually placed onto the feed conveyor 21 or reach the feed conveyor 21 via a conveyor belt. The feed conveyor 21 may also be realized in the form of a belt conveyor.

The book block feeder 30 can be considered a functional unit comprising the combination of the infeed channel 11, upstream feed conveyor 21, star feeder 31.

The star feeder 31 is rotationally driven in an intermittent fashion by a servomotor 35 and consists of a roller that is divided into disks 33 and has a main rotational axis 32 that is oriented parallel to the channel direction. The roller features several block receptacles 34 in the form of cutouts that are arranged in a star-shaped fashion and respectively feature perpendicularly aligned first and second locating surfaces 34.1 and 34.2. The individual disks 33 penetrate through openings 23 in the slide sheet 22 and lift the book blocks 2 off the feed conveyor 21 as the rotation of the star feeder 31 begins.

The star feeder 31 features several clamping jaws 36 that are respectively assigned to the block receptacles 34 and arranged parallel to the second locating surfaces 34.2, as well as movable relative to the latter. The book blocks 2 are respectively pressed against the second locating surfaces 34.2 by the clamping jaws 36 and thusly fixed during the uprighting in the block receptacles 34 such that they cannot shift or tilt.

The clamping jaws 36 are situated on the end of a rod 37 that is guided in linear guides 38 and acted upon in the clamping direction by a force exerted by a tension spring 39. The clamping jaws 36 are opened and closed by means of a control cam 41, on which cam rollers 40 situated on the rods 37 roll during the rotation of the star feeder 31. The clamping jaws 36 are pressed into a maximally opened position by the control cam 41 and simply released in order to clamp the book blocks 2.

In order to fix the respective book block 2 in the corresponding block receptacle 34 before the rotation of the star feeder 31 begins, the control cam 41 is turned forward by a certain angular range from the position drawn with broken lines in FIG. 1 into the position drawn with continuous lines by means of a cyclically actuated pneumatic cylinder 42 while the star feeder 31 is at a standstill in order to release the cam roller 40 and therefore the clamping jaw 36 and once again turned back into the initial position during the rotation of the star feeder 31.

The control cam 41 is realized in such a way that the clamping jaws 36 are opened just before the upright position is reached. In the upright position, the book blocks 2 are placed on a channel bottom 44 while they are laterally supported by the second locating surface 34.2 on the one hand and by guide sheets 43 that can be adjusted to the block thickness on the other hand. The respective upright book block 2 is pushed off in the direction of the infeed channel 11 by means of a separately driven push-out unit 51 and quasi transferred to the pushers 14 in synchronism.

In the exemplary embodiment, two push-out units 51 are arranged on a revolving conveyor chain 52 and alternately push off the book blocks 2. The push-out units 51 are respectively guided by means of a coupler 54 that is also connected to the conveyor chain 52 in such a way that they are always oriented transverse to the conveying direction when they are retracted from the infeed channel 11 after the book blocks 2 were transferred to the pushers 14 of the infeed channel 11.

The conveyor chain 52 is driven by a separate servomotor 53 such that it is possible to realize a gentle start of the push-out unit 51 relative to the respective book block 2 to be pushed off on the one hand and a synchronous transfer to the continuously moving pushers 14 of the infeed channel 11 on the other hand. The push-off motion may be variable in accordance with the feed position and/or the format height of the book blocks 2. The separate drive of the push-out unit 51 can also be used for suspending the transfer to the infeed channel 11 or for feeding the book blocks 2 to certain pushers 14 and therefore certain transport clamps of the perfect binder.

In the top view according to FIG. 2, the star feeder 31 is integrated into the infeed channel 11. Book blocks 2 supplied at a location of the infeed channel 11 that lies farther toward the rear can be guided past the star feeder 31 by transferring the book blocks 2 from the supply channel section into the continuing channel section by means of the push-out units 51.

Figure 3:
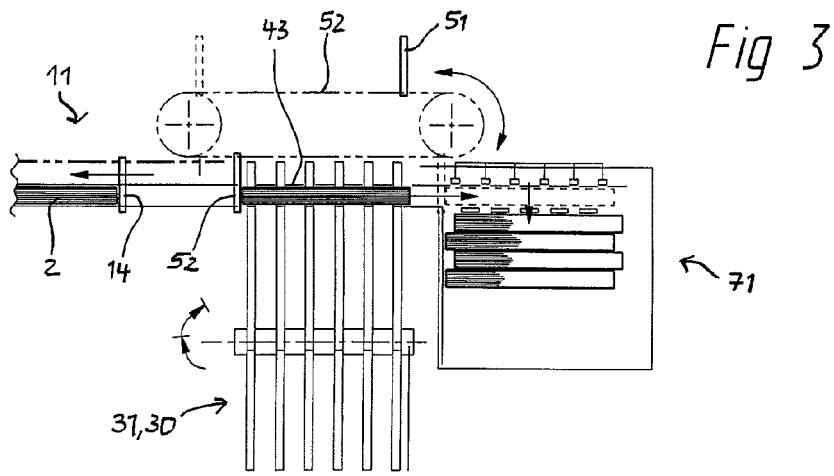
FIG. 3 shows a simplified top view of the star feeder with a transverse stack delivery.

FIG. 3 shows a transverse stack delivery 71 that is arranged opposite of the infeed channel 11 leading to the subsequent processing arrangement. The book blocks 2 that were positioned upright by the star feeder 31 and placed into the infeed channel 11 are selectively pushed off in the opposite direction referred to the infeed channel 11 and fed to the transverse stack delivery 71 for staggered stack formation, for example, in order to exclude book blocks 2 that were determined to be faulty from subsequent processing and to once again feed the book blocks to the subsequent processing arrangement later on by means of the star feeder 31. The push-out units 51 are designed for conveying in both directions. A second alternative subsequent processing arrangement may be connected to the book block feeder 30 instead of the transverse stack delivery 71.

Figure 4:
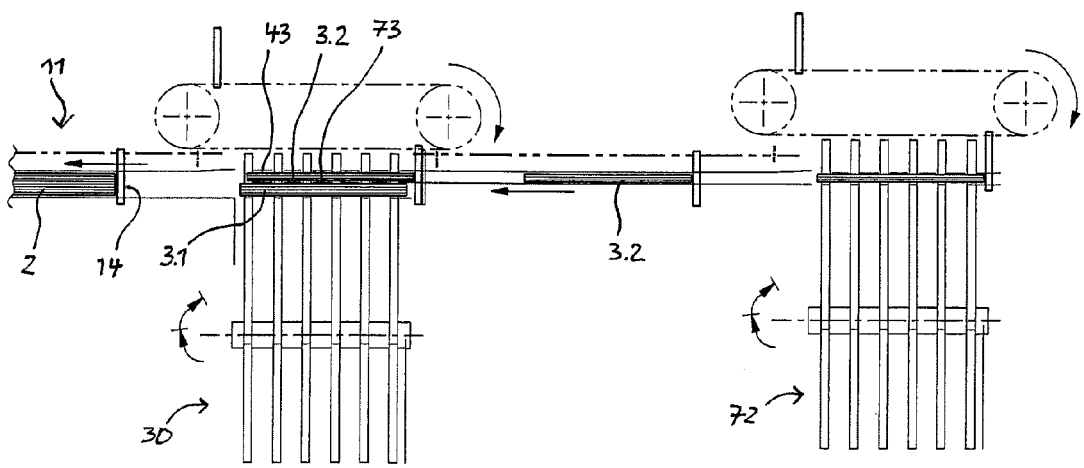
FIG. 4 shows a top view of an arrangement with two star feeders.

FIG. 4 shows the arrangement of a second book block feeder 72. Second partial blocks 3.2 supplied by means of this second book block feeder and first book blocks 3.1 supplied by means of the first book block feeder 30 are joined into complete book blocks 2 and transferred to the infeed channel 11. For this purpose, an intermediate wall 73 is provided in the region of the first book block feeder 30 in order to push the second partial block 3.2 next to the first partial block 3.1. The two book block feeders 30, 72 may also be used for the selective feed of book blocks 2.

FIG. 1 also shows a block thickness measuring device 45 that is integrated into the star feeder 31. The respective clamping position of the clamping jaws that are actuated into the closed position is determined during the rotation of the star feeder 31 by means of a stationary magnetic tape reader 46 and magnets 47 arranged on the rods 37 and fed to an evaluation unit. The measured block thickness can be used for adjustments of the subsequent processing arrangement that are dependent on the block thickness and/or a thickness control is carried out as part of a completeness check that makes it possible to purposefully sort out rejects prior to subsequent processing.

The invention claimed is:

1. A device (30) for feeding book blocks (2) standing in an upright orientation on a spine or fore edge cut to subsequent processing equipment, comprising:

an infeed channel (11) for the subsequent equipment, having a channel bottom (12), lateral channel guides (13) and at least one pusher (14) that pushes the book blocks (2) standing on their spine (2a) or fore edge cut forward into the equipment;

a star feeder (31) in the form of a roller intermittently rotatable about a main axis (32), comprising a plurality of block receptacles (34) arranged in a star pattern, wherein each receptacle is formed by first and second locating surfaces on each of a plurality of axially spaced disks (33), said first locating surfaces (34.1) extending radially and said second locating surfaces (34.2) extending perpendicular to the first locating surfaces;

an upstream book block conveyor (21) that feeds flat book blocks (2) to the star feeder (31) substantially tangentially to the roller and transversely to the main axis (32); wherein the star feeder includes a plurality of clamping jaws (36) that are respectively operatively associated with the plurality of block receptacles (34), each clamping jaw of a receptacle arranged substantially parallel to the second locating surfaces (34.2) and movable transversely relative to the second locating surfaces (34.2) in opening and clamping directions; and each receptacle receives a flat book block from the upstream book block conveyor (21) while the respective clamping jaw (36) is relatively open, during rotation of the star feeder (31) reorients the flat book block into said upright orientation while clamped between said respective jaw and said second locating surfaces (34.2), thereby positioning the upright book block for transport in a direction parallel to the rotation axis (32) and through the infeed channel.

2. The device according to claim 1, wherein the clamping jaws (36) are spring biased toward the second locating surfaces (34.2).

3. The device according to claim 1, including a cam (41) that controls the movement of the clamping jaws.

4. The device according to claim 3, wherein the cam (41) is turned back and forth about the rotational axis (32) of the star feeder (31) in a cyclic fashion by a driving means such that at least the clamping motion of the clamping jaws (36) takes place while the star feeder (31) is at a standstill.

5. The device according to claim 3, wherein the clamping jaws (36) are opened during the rotational motion of the star feeder (31) just before the book blocks (2) reach the upright orientation.

6. The device according claims 1, wherein a block thickness measuring device (45) is assigned to the clamping jaws (36).

7. The device according to claims 1, wherein the pusher (14) of the infeed channel (11) is driven by one drive device and at least one other, and separately driven push-out unit (51) pushes upright book blocks from the star feeder (31) toward the pusher of infeed channel (11).

8. The device according to claim 7, wherein the at least one other push-out unit (51) selectively pushes the book blocks (2) off the star feeder (31) in opposite conveying directions.

9. The device according to claim 7, wherein the star feeder positions the upright book block for transport in a direction aligned with the infeed channel (11) and the at least one other push-out unit (51) transfers and conveys the book blocks (2) as so positioned by the star feeder, in the conveying direction of the infeed channel (11).

10. The device according to claim 9, wherein a partition wall (73) that is aligned with the infeed channel at a location where the star feeder (31) positions book blocks for transport, joins book blocks (3.1, 3.2) that are supplied by said the star feeder (31) and separately supplied in the conveying direction of the infeed channel (11).

11. The device according to one of claims 1, wherein at least two star feeders (31, 72) are arranged on the infeed channel (11).

12. The device according to claim 3, including a cam (41) that controls the movement of the clamping jaws.

13. The device according to claim 12, wherein the cam (41) is turned back and forth about the rotational axis (32) of the star feeder (31) in a cyclic fashion by a pneumatic cylinder such that at least the clamping motion of the clamping jaws (36) takes place while the star feeder (31) is at a standstill.

14. The device according to claim 12, wherein the clamping jaws (36) are opened during the rotational motion of the star feeder (31) just before the book blocks (2) reach the upright orientation.

15. The device according to claim 1, wherein
the clamping jaws are biased toward the second locating surfaces (34.2);
a cam (41) controls the movement of the clamping jaws;
the cam (41) is turned back and forth about the rotational axis (32) of the star feeder (31) in a cyclic fashion by a driving means such that at least the clamping motion of the clamping jaws (36) takes place while the star feeder (31) is at a standstill;
the clamping jaws (36) are opened during the rotational motion of the star feeder (31) just before the book blocks (2) reach the upright orientation; and
the pusher (14) of the infeed channel (11) is driven by one drive device and at least one other, and separately driven push-out unit (51) pushes upright book blocks from the star feeder (31) toward the pusher of infeed channel (11).

16. A device (30) for feeding book blocks (2) standing in an upright orientation on a spine or fore edge cut to subsequent processing equipment, comprising:
an infeed channel (11) for the subsequent equipment, having at least one pusher (14) that pushes the book blocks (2) standing on their spine (2a) or fore edge cut in a forward direction to the equipment;
a star feeder (31) rotationally driven in an intermittent fashion, comprising a roller that has a main rotational axis (32) that is oriented parallel to the infeed channel (11);
said roller comprising a plurality of block receptacles (34) in the form of cutouts that are arranged in a star-shaped pattern, each cut out defining perpendicularly aligned first and second locating surfaces (34.1 and 34.2),
a book block conveyor (21) that feeds flat book blocks (2) to the star feeder (31) transversely to the main axis (32); wherein
the star feeder (31) includes a plurality of clamping jaws (36) that are respectively operatively associated with the plurality of block receptacles (34), each clamping jaw of a receptacle arranged substantially parallel to the second locating surfaces (34.2) and movable transversely relative to the second locating surfaces (34.2) in opening and clamping directions; and
in each of a series of intermittent feed cycles, a receptacle receives a flat book block from the book block conveyor (21) while the respective clamping jaw (36) is relatively open, and reorients the flat book block into said upright orientation while clamped between said respective jaw and said second locating surfaces (34.2), thereby positioning the upright book block at the infeed channel, for transport in a direction parallel to the rotation axis (32).

17. The device according to claim 16, wherein each receptacle (34) is formed by a plurality of axially spaced apart disks (33).

18. The device according to claim 17, wherein, at the beginning of each feed cycle, each disk (33) of a receptacle (34) enters a respective opening (23) in a horizontal slide surface (22) of the conveyor (21) and the disks of each receptacle together lift a respective book block (2) off the conveyor (21).

19. The device according to claim 18, wherein the pusher (14) of the infeed channel (11) is driven by one drive device and at least one other, separately driven push-out unit (51) pushes upright book blocks from the star feeder (31) toward the pusher of infeed channel (11).

* * * * *